United States Patent Office 3,300,348
Patented Jan. 24, 1967

3,300,348
EXPLOSIVE CONITRATES AND PROCESS FOR
PREPARING THE SAME
George L. Griffith, Coopersburg, Pa., assignor to Trojan
Powder Company, Allentown, Pa., a corporation of
New York
No Drawing. Filed Oct. 20, 1965, Ser. No. 499,019
14 Claims. (Cl. 149—93)

This invention relates to an explosive conitrate and to a process for preparing the same, and more particularly to a process for conitrating starch and an alcohol, and to to the explosive conitrates obtainable from this process.

Tenney L. Davis, The Chemistry of Powder and Explosives (1941), points out that the history of modern explosives commenced with the joint discoveries of nitroglycerine and nitrocellulose. These two materials were prepared independently, but at about the same time. Sobrero first prepared nitroglycerine, and Schönbein and Böttger independently each nitrated cotton. Prior to that, Braconnot had prepared a nitric ester from starch which he called xyloidine. The possibilities of the use of these materials in artillery occurred to the discoverers almost at once, and led to a proliferation of research and publications on the nitration of glycerine, starch and cellulose throughout the Western world. The nitration of cotton was effected by Schönbein by the use of a mixture of nitric acid and sulfuric acid in the proportion of 1:3 by volume (British Patent No. 11,407/1846). Mixed acids were nearly always used thereafter in the nitration of these raw materials.

Originally, nitrostarch was prepared by dissolving the starch in strong nitric acid, and then precipitating the nitric ester which is formed in solution in the acid by mixing the solution with sulfuric acid, or with spent acid from some other nitration, as from the nitration of glycerine. This product, which is very similar to the original xyloidine of Braconnot, showed a very poor stability and could not be safely stored or handled when dry. The dry material also was pulverulent and dusty. Nitrostarch as it is presently manufactured in the U.S.A., is normally nitrated with mixed acid, and the product retains the appearance of ordinary starch. A nitrostarch containing 12.75% nitrogen can, according to Tenney L. Davis, be prepared by using a mixed acid containing 38% nitric acid and 62% sulfuric acid, using a temperature of 32° C. initially, and keeping the temperature during nitration between 38 and 40° C. At the end of the nitration, the contents of the nitrator are drowned, and the product purified by cold water washings. Ammonia can be used to neutralize the acidity during the preliminary washing, and the product is dried at 35 to 40° C.

The development of nitroglycerine led to experiments in the nitration of other polyols, and from these experiments a series of polyol nitric acid esters were obtained, including pentaerythritol tetranitrate, dipentaerythritol hexanitrate, trimethylolethane trinitrate, the various nitro sugar, including nitroglucose, nitromannose, nitrolmaltose, nitrosucrose, nitroarabinose and nitrolactose, nitromannite, trimethyleneglycol dinitrate, butyleneglycol dinitrate, propyleneglycol dinitrate and erythritol tetranitrate. Of these esters, pentaerythritol tetranitrate is probably the most stable and the least reactive, and it has come into wide use. It is extraordinarily sensitive to initiation, and has a high brisance.

Pentaerythritol tetranitrate is a crystalline solid of high melting point, crystallizing from water in white tetragonal crystals, having a melting point of 253° C. These physical properties distinguish it from the liquid nitric acid esters, such as propylene glycol dinitrate, nitroglycerine, butyleneglycol dinitrate. The liquid esters are more difficult to use than the solid esters, and usually are absorbed on a solid material, or formulated as a gel. Even the low melting solids such as erythritol tetranitrate are not as advantageously used in powdered explosive formulations as the high melting solids, which include, in addition to pentaerythritol tetranitrate, mannitol hexanitrate and some of the sugar nitro esters. The sugar nitro esters present, however, a different problem, in that they are less stable than the nitric esters of the polyols, and furthermore, they are rather difficult to purify. They resemble the sugars from which they are derived, in that they do not crystallize rapidly or easily, and when warmed gently they frequently soften, and become sticky and resinous. In this condition, they retain traces of decomposition products, by which further decomposition is provoked, and they cannot be washed free from acid.

The problems associated with the nitration of the sugar alcohols and starch early led the art to experiment with the conitration of these materials with cellulose. U.S. Patent No. 1,008,725 dated November 14, 1911, to Lindley, describes the conitration of mixed cellulose and starch in the presence of nitrobenzene, nitrotoluene, or glycerine. The purpose of the nitrobenzene, nitrotoluene or glycerine is to give higher power to the explosive. After nitration, the mixed nitrate esters are treated with nitrobenzene, and also desirably a solution of an inorganic nitrate. Reissue No. 6,615 to Dittmar, dated September 14, 1875, describes the nitration of vegetable fiber converted into pulp in admixture with a solution of sugar, mannitol, starch or inuline, after which the product may be soaked in or have applied to it a quantity of nitrogylcerine, or soda and saltpeter. The combination of the sugar, mannitol, starch or inuline is said to produce a powerful explosive, and to overcome the difficulty of the nitration of such materials in the absence of the pulp. The pulp is said to be an excellent absorbent for the nitroglycerine. None of the conitrated processes have come into commercial use however, since the conitrated products were not found to possess any advantageous properties, as compared to the separately nitrated nitroesters.

In many types of explosive formulations, it is customary to employ mixtures of sensitizing explosives, of which the various nitroesters are exemplary. In the case of the liquid nitro esters, such mixtures can be prepared simply by absorbing the liquid nitro ester on the solid particles of a solid sensitizing explosive such as trinitrotoluene or nitrocellulose. The solid esters, however, present a different problem. Nitrostarch, for example, because of its small particle size, tends to be highly dusty when dry. When mixed mechanically with a material such as pentaerythritol tetranitrate, it has a tendency to segregate out, which is not only undesirable, since a homogeneous mixture is of course intended, but may also be hazardous.

Quite apart from the hazards of segregation of such mixtures, the formulation of the mixtures can also present a problem. To obtain a homogeneous mixture, for instance, it frequently is desirable to mechanically grind the components of the mixture together, but needless to say, this can be very hazardous, when explosives such as nitrostarch or pentaerythritol tetranitrate are to be mixed. As a practical matter, the preparation of mechanical mixtures of solid explosive sensitizers is not really feasible, because of the hazards involved.

In accordance with the invention an explosive conitrate is prepared by a procedure that avoids the necessity of mechanically mixing hazardous explosives. The conitrate of the invention is also nonsegregating, and in this respect avoids the problems entailed in handling mechanical mixtures. The conitrates of the invention comprise, in combination, conitrated particles of nitrostarch and a solid nitro alcohol. This conitrate is prepared by the conitration of starch and an organic alcohol, using a nitric acid as a nitrating agent, preferably in admixture with sulfuric acid.

The conitrates of the invention are non-segregating because the particles of nitrostarch and nitro alcohol therein are joined, either chemically or physically, or both. In this respect, the conitrates of the invention differ, either chemically or physically, or both, from mere mechanical mixtures of these components.

Furthermore, the explosive properties of the conitrates may differ in several respects from the properties of a mechanical mixture. The explosive conitrates of the invention have been found to show a higher detonator sensitivity and a higher rate of detonation than the corresponding mechanical mixtures. In some respects, the properties of the conitrates appear to differ from the properties of the nitrostarch and nitro ester components taken individually.

The unusual properties of the explosive conitrates of the invention have not been explained, although considerable research has been carried out on this aspect of the invention. The conitrate may be a complex compound or association complex or a solid solution.

The process of the invention is effected by nitrating a mixture of starch and the organic alcohol. These raw materials are subjected to the action of concentrated nitric acid, preferably in the form of a concentrated aqueous solution, containing at least 8% nitric acid by weight, and preferably in admixture with sulfuric acid to facilitate the nitration and the separation of the conitrate reaction product. In such cases, the amount of sulfuric acid that is used is sufficient to inhibit dissolution of the nitric esters in the nitrating reagent.

The invention is applicable to starch from any source. Corn starch is the starch material of preference for the preparation of nitrostarch in the United States, but other starches that can be used, either alone or in admixture with cornstarch, include cassava or tapioca starch, potato starch, rice starch, animal starch, wheat starch, barley starch, rye starch, pea starch, arrowroot starch, bean starch, buckwheat starch and oat starch.

The organic alcohol that is used is an alcohol that upon nitration yields a solid nitro ester. In most cases, but not always, such alcohols are also themselves solids. The preferred alcohols are pentaerythritol and dipentaerythritol, but there can also be used other derivatives of pentaerythritol such as hydroxy acid esters of pentaerythritol, described in U.S. Patent No. 2,086,145 to Wyler, tripentaerythritol and tetrapentaerythritol, and higher polymeric ethers formed by self-condensation of pentaerythritol. Additional polyols that can be used include mannitol, sorbitol, erythritol, xylitol, dulcitol, neopentyl glycol and trimethylolpropane.

If it be desired that the conitrate include the properties of a liquid nitro ester, then there can be incorporated with the starch and alcohol reactants an alcohol yielding a liquid nitro ester upon nitration. Such alcohols include glycerol, ethylene glycol, diethylene glycol, propylene glycol, dipropylene glycol, trimethylene glycol, butylene glycol-1,4, trimethylolmethane, and trimethylolethane. Any of the various sugars or mixtures thereof also can be included, such as dextrose, arabinose, sucrose, fructose, galactose, lactose, mannose, maltose, xylose and erythrose, as well as the hydrolyzed starches or polysaccharides such as the dextrines.

The starch and alcohol are used in the proportions required to give the desired properties in the final conitrate. The conitrate can contain from 10 to 90% nitrostarch, from 10 to 90% solid nitro ester, and from 0 to 50% liquid nitro ester. By the term "solid nitro ester" there is intended any nitro ester having a melting point of 100° F. or above. Preferably, however, the "solid" esters should have a melting point of at least 100° C., well above any temperature to which it may be exposed during use. Any nitro ester having a melting point below 100° F., including the lower melting solid nitro esters, such as erythritol tetranitrate, is considered a liquid nitro ester, for the purposes of this invention. Included in the group of liquid nitro esters are the nitro sugars of such low melting points.

It will be evident from the above that the invention is applicable to organic alcohols of the class, and preferably to solid polyols such as pentaerythritol and dipentaerythritol, having from two to about fifty carbon atoms and at least four hydroxyl groups for each six carbon atoms.

The usual nitrating reagent is nitric acid. However, fuming nitric acid can also be used. The reaction proceeds in a concentrated nitric acid solution containing at least 10% and preferably about 12.75% nitrogen or more. However, nitric acid solutions containing as little as 8% nitrogen by weight can be employed.

The conitrate reaction product is soluble in nitric acid at this concentration, and thus it is necessary to isolate the product by precipitation. Dilution of the nitric acid with water or by mixing the reaction solution with sulfuric acid, or with the spent acid from some previous nitration, will result in precipitation of the ester. This can be separated by filtration and washed.

A preferred process, however, employs a mixture of concentrated nitric acid with sufficient sulfuric acid to render the nitro ester reaction product insoluble in the reaction mixture. The starch and alcohol starting material may or may not be soluble in the reaction mixture, but this makes little difference, since the insolubility of the nitro ester aids in driving the reaction to completion.

When a mixture of nitric and sulfuric acids is employed as the nitrating reagent, satisfactory proportions of nitric acid are within the range from about 95 to about 25% nitric acid by weight and from about 5 to about 75% sulfuric acid by weight. The reaction mixture can also include up to 25% nitrogen dioxide, and up to 10% water. Preferred proportions of nitric acid are from 33 to 43% and sulfuric acid from 57 to 67% by weight.

The starch and polyol can be mixed and then brought in contact with the nitrating agent. However, it is usually preferable to mix the alcohol with the nitrating agent, adding the alcohol slowly thereto, and then, after all of the alcohol has been added, the starch is slowly added to the reaction mixture. The reaction mixture is preferably stirred or otherwise agitated so as to maintain it homogeneous throughout the reaction. Thereafter, the precipitated nitro ester conitrate is separated, and washed several times with cold water to remove excess acid.

If desired, the product can be washed with an aqueous base, so as to bring its pH within the range from about 6 to about 8. Any alkaline substance can be used for this purpose, but it is usually preferable to employ an inorganic or organic base such as sodium hydroxide, potassium hydroxide, calcium hydroxide, or an organic amine such as triethanolamine, or tributylamine. A volatile base such as an organic amine, or ammonia, may be preferable so as to avoid contamination of the product by residual solid alkali.

It is also possible to mix the starch and the alcohol, and add these preferably in small increments to the nitrating reagent. Usually, however, it is not desirable to mix the starch and the alcohol and then add the nitrating reagent, as the heat of reaction may then become excessive, due to the difficulty of providing adequate cooling during mixing of a small amount of liquid material with a large amount of solid material.

The amount of nitric acid employed is normally that stoichiometrically required to nitrate the free hydroxyl groups of the alcohol and of the starch. A small excess, ranging from 5 to 25% of nitric acid, can be used to ensure completion of the nitration. In computing the amount stoichiometrically required to nitrate the starch, the three free hydroxyl groups of each anhydroglucopyranose unit $C_6H_{10}O_5$ of the starch is used as the base unit.

The nitration is carried out at a temperature at which nitration proceeds but below the temperature of decomposition of the conitrate reaction product. Since the reaction will proceed at a satisfactory speed at only slightly above room temperature, the normal maximum temperature used is about 75° F., and preferably the temperature is within the range from about 25° to about 45° F. The reaction is exothermic, and cooling may be required to maintain the temperature within this range.

If desired, an agglutinating agent can be included with the conitration reaction product. Such materials are conventional additives to dry dusty materials such as nitrostarch. Typical agglutinants include shellac and coumeroneindene resin, with or without a mineral oil. Such agglutinants normally are added in amounts ranging up to 10% by weight.

The conitrate of the invention is useful as a sensitizing explosive in any type of explosive formulation. In such formulations, the conitrates display the desirable properties of the nitro ester components, plus the additional feature of being nonsegregating and consequently homogeneous at all times, plus a higher detonator sensitivity and rate of detonation, as compared to the nitrostarch and nitro ester taken separately. Because these conitrates are solids, they can be used in dry powders as well as in gels, pastes, slurries and extrudable semi-solid or thixotropic compositions.

The preferred explosive formulations in accordance with the invention include together with the conitrate an oxidizing agent, preferably an inorganic nitrate, and a fuel.

Ammonium nitrate and nitrates of the alkali and alkaline earth metals, such as sodium nitrate, potassium nitrate, calcium nitrate, magnesium nitrate, strontium nitrate, and barium nitrate, are exemplary inorganic nitrates. Mixtures of several nitrates, such as for example, mixtures of sodium and ammonium nitrates, also yield excellent results. The inorganic nitrates may be fine, coarse or a blend of fine and coarse material. Mill and prill inorganic nitrates are quite satisfactory. For best results, the inorganic nitrates are usually fine grained.

In addition to or in lieu of inorganic nitrates, there can also be used inorganic chlorates or perchlorates. These also will be used in the form of the ammonium, alkali metal or alkaline earth metal salts.

Preferred oxidizing agents are the ammonium nitrates, chlorates or perchlorates, alone or in admixture with alkali and alkaline earth metal nitrates, chlorates and perchlorates.

In addition to the oxidizer, there is also employed one or more fuels, including metal fuels and carbonaceous fuels. The metal fuels will usually comprise from about 0.5% to about 25% by weight of the formulation. The preferred metal fuel is aluminum, such as flake aluminum or powdered aluminum, but other metals such as ferrosilicon and ferro-manganese also can be used.

In addition to or in lieu of the metal fuel, a carbonaceous fuel can be included, such as powdered coal, petroleum oil, coke dust, charcoal, bagasse, dextrin, starch, wood meal, flour bran meal, pecan meal, and similar nutshell meals. A carbonaceous fuel when present will comprise from about 0.5 to about 30% of the mixture. As indicated, mixtures of the metal and carbonaceous fuel can be used, if desired.

An antacid or other stabilizing material, such as zinc oxide, calcium carbonate, aluminum oxide and sodium carbonate, can also be added. Such ingredients will comprise from about 0.3 to about 5% of the mixture.

The conitrates of the invention, because of their non-segregating characteristics, are especially useful in slurried compositions, such as those disclosed in U.S. patents Nos. 3,083,127, dated March 26, 1963, and 3,147,163, dated September 1, 1965, the entire disclosures of which are hereby incorporated by reference. The conitrate would be used in lieu of all or part of the nitrostarch, in the aqueous slurries of No. 3,083,127, and in lieu of all or part of the sensitizer in the oil slurries of No. 3,147,163. In these slurries, the conitrates of the invention contribute an enhanced detonator sensitivity and rate of detonation.

The conitrates of the invention also are useful as the sensitizing explosive in primer cord. For this purpose, it would be used as the core, within the tube of protective material, such as a waterproofed textile, as in the case of Primacord.

The following examples in the opinion of the inventors represent preferred embodiments of this invention.

*Examples 1 to 5*

A group of conitrates was prepared in which the proportions of starch to pentaerythritol ranged from 95 parts by weight of starch and 5 parts by weight of pentaerythritol to 75 parts by weight of starch and 25 parts by weight of pentaerythritol. The starch used was cornstarch. The nitrating procedure was as follows.

Into a 20 gallon reactor fitted with a cooling jacket for temperature control and a stirrer, was placed 10 gallons of a mixture of nitric acid and sulfuric acid containing 38% nitric acid and 62% sulfuric acid. To this mixture was added slowly, in small increments, 5 lbs. of finely ground pentaerythritol. During the addition, the temperature was kept at 38° F. After all of the pentaerythritol had been added, 0.5 lb. of starch was added, while maintaining the temperature of the reaction mixture at 40° F. The reaction was then allowed to continue at this temperature, with stirring throughout, until the reaction was complete, as evidenced by a cessation in the evolution of heat. The total reaction time was five hours.

At the conclusion of the reaction, the contents of the reactor was dumped into 100 gallons of cold water, and the conitrate product which separated was removed by centrifuging. The conitrate was then washed with aqueous ammonia, and then with several cold water washings. The final product had a pH of 7.5, and contained 95% nitrostarch and 5% pentaerythritol tetranitrate.

This reaction procedure was repeated, using different proportions of starch and pentaerythritol, to give conitrates having weight ratios of starch:pentaerythritol ranging from 95:5 to 75:25.

For purposes of comparison, mechanical mixtures corresponding in weight proportions to the conitrates were made by careful mechanical mixing of powdered nitrostarch and powdered pentaerythritol tetranitrate. The resulting formulations together with the conitrates were then tested for impact sensitivity by the following test procedure.

First, a two kilogram weight was dropped on 0.1 gram samples of the material, starting at a height of 100 cm., decreasing the height at 5 cm. increments until no detonation occurred. This procedure was then repeated, using a 10 kilogram weight. The following results were obtained.

TABLE I

| Example No. | Ratio of Starch to PE | Impact Sensitivity Conitrate | | Impact Sensitivity Mechanical Mixture | |
|---|---|---|---|---|---|
| | | 10 kg. wt. | 2 kg. wt. | 10 kg. wt. | 2 kg. wt. |
| 1 | 95:5 | 70 cms. | 100 cms.+ | 50 cms. | 1 partial at 100 cms. |
| 2 | 90:10 | 65 cms. | 100 cms.+ | 55 cms. | 100 cms. |
| 3 | 85:15 | 65 cms. | 100 cms.+ | 55 cms. | 100 cms. |
| 4 | 80:20 | 60 cms. | 100 cms.+ | 35 cms. | 1 partial at 100 cms. |
| 5 | 75:25 | 45 cms. | 60 cms. | 35 cms. | 1 partial at 100 cms. |

In this test, the conitrates were shown to have a considerably reduced impact sensitivity. This suggests that the starch and pentaerythritol are in some form of physical combination that differs from a mere mechanical mixture.

The conitrates and the mechanical mixtures also were subjected to segregation tests, involving storing 100 gram samples of the materials in glass jars, and subjecting the jars to slight vibration for periods of two months. At the completion of the test, the conitrates were homogeneous, while the mechanical mixtures had become segregated to two layers, a lower layer of pentaerythritol tetranitrate and an upper layer of nitrostarch. These results show that in the conitrates of the invention, the particles of pentaerythritol tetranitrate and nitrostarch are in some way associated so that no segregation is possible.

*Examples 6 to 10*

Examples 1 to 5 were repeated, substituting tapioca starch for the cornstarch. The conitrates were then subjected to impact sensitivity tests, exactly as in the previous examples, with the following results:

The results show the considerably reduced impact sensitivity of the conitrates, just as in the case of the conitrates prepared using cornstarch.

These conitrates and mechanical mixtures also were subjected to the segregating tests of Examples 1 to 5. At the completion of the test, the conitrates were still homogeneous, while the mechanical mixtures had become segregated into a lower pentaerythritol tetranitrate layer and an upper nitrostarch layer.

*Example 11*

Semi-solid aqueous slurries were made up, as in No. 3,083,127, using the 85:15 conitrate of Example 3, and pure nitrostarch as a control.

The slurry compositions were as follows:

| Ingredients | Percent by weight | |
|---|---|---|
| | Control, percent | Example 11 Conitrate, percent |
| Nitrostarch, dry | 13.10 | |
| 85:15 Conitrate of Example 2 | | 13.10 |
| Ammonium nitrate, crushed E-2 prills (1/16" Screen) | 53.50 | 53.50 |
| Sodium Nitrate, mill | 15.00 | 15.00 |
| Zinc Oxide | 0.60 | 0.60 |
| Aluminum flake (mill) | 1.75 | 1.75 |
| Sodium carboxymethyl cellulose | 1.30 | 1.30 |
| Petroleum Oil (No. 5) | 0.25 | 0.25 |
| Water | 9.40 | 9.40 |
| Nut Meal | 3.00 | 3.00 |
| Guar Gum | 0.30 | 0.30 |
| Coal | 1.50 | 1.50 |
| Sodium Thiosulfate | 0.30 | 0.30 |
| | 100.00 | 100.00 |

These materials were extruded through conventional extrusion nozzles into polyethylene tubing 1½" in diameter by 12" long. The tubing was secured at both ends, and "D" sensitivity tests were then run in 1½" Schedule 40

TABLE II

| Example No. | Ratio of Starch to PE | Impact Sensitivity Conitrate | | Impact Sensitivity Mechanical Mixture | |
|---|---|---|---|---|---|
| | | 10 kg. wt. | 2 kg. wt. | 10 kg. wt. | 2 kg. wt. |
| 6 | 95:5 | 70 cms. | 100 cms.+ | 50 cms. | 1 partial at 100 cms. |
| 7 | 90:10 | 65 cms. | 100 cms.+ | 55 cms. | 100 cms.+ |
| 8 | 85:15 | 65 cms. | 100 cms.+ | 55 cms. | 100 cms.+ |
| 9 | 80:20 | 60 cms. | 100 cms.+ | 35 cms. | 1 partial at 100 cms. |
| 10 | 70:25 | 45 cms. | 60 cms. | 35 cms. | 1 partial at 100 cms. | steel pipe capped at one end. The results are given in the table below:

EXAMPLE III

| Test | Control | Example 11 |
|---|---|---|
| "D" sensitivity 1½" x 12" pipe. | 10 gm. Pentolite | 2 gm. PETN. |
| Stick density | 1.50 | 1.45. |

These results show that the conitrate has a greatly increased detonator sensitivity, as compared to the pure nitrostarch.

*Example 12*

Dry stick powders were prepared using the 85:15 conitrate of Example 3 (Example 12 in table below), an 85:15 mechanical mixture of the same proportions formed by milling the two materials together, and oil-free nitrostarch, mixed with the other ingredients shown in the table below.

| Ingredients | Percent by Weight | | |
|---|---|---|---|
| | Example 12 Conitrate | Mechanical Mixture | Control |
| 85:15 Conitrate of Example 3 | 13.50 | | |
| 85:15 Mechanical Mixture | | 13.50 | |
| Nitrostarch | | | 13.50 |
| Ammonium Nitrate, mill grained | 79.70 | 79.70 | 79.70 |
| Sodium Nitrate | 2.05 | 2.05 | 2.05 |
| Zinc Oxide | 0.10 | 0.10 | 0.10 |
| Bagasse | 3.00 | 3.00 | 3.00 |
| Aluminum flake | 1.40 | 1.40 | 1.40 |
| Petroleum Oil (No. 5) | 0.25 | 0.25 | 0.25 |
| | 100.00 | 100.00 | 100.00 |

Cartridges 1¼" in diameter by 8" long were filled using the above compositions. These cartridges were tested for "D" sensitivity value, impact sensitivity to a 10 kg. and to a 2 kg. weight, and ballistic pendulum value. The results are given in Table IV.

TABLE IV

| Test | Example 12 | Mechanical mixture | Control |
|---|---|---|---|
| "D" sensitivity 1¼" x 8". | No. 1 cap | No. 1 cap | No. 1 cap. |
| Gap 1¼" x 8" | 4/4–4 cm | 4/4–4 cm | 4/4–4 cm. |
| | 3/4–6 cm | 2/4–6 cm | 1/4–6 cm. |
| Ballistic Pendulum | 11.4 | 11.2 | 11.5. |
| Impact 10 kg | 30 cm | 25 cm | 25 cm. |
| Impact 2 kg | 100 cm | 95 cm | 95 cm. |

These results confirm the lower impact sensitivity and the greater gap sensitivity of the conitrate over the mechanical mixture when used in an explosive composition.

In addition, the ballistic pendulum value test indicates a somewhat higher explosive effectiveness for the conitrate.

*Example 13*

An explosive slurry composition of the type of No. 3,083,127 was prepared, using the 85:15 conitrate of Example 8, and the other ingredients shown in the table. A second composition was prepared using a mechanical mixture of the same proportions, and a third using nitrostarch as a control.

| Ingredients | Percent by Weight | | |
|---|---|---|---|
| | Example 13 Conitrate | Mechanical mixture | Control |
| 85:15 Conitrate of Example 8 | 12.00 | | |
| 85:15 Mechanical mixture | | 12.00 | |
| Nitrostarch | | | 12.00 |
| Ammonium nitrate | 71.00 | 71.00 | 71.00 |
| ZnO | 0.50 | 0.50 | 0.50 |
| Riffle Coal | 3.30 | 3.30 | 3.30 |
| Guar gum | 0.30 | 0.30 | 0.30 |
| Petroleum Oil | 0.40 | 0.40 | 0.40 |
| Water | 12.50 | 12.50 | 12.50 |
| | 100.00 | 100.00 | 100.00 |

These materials were extruded through conventional extrusion nozzles into polyethylene tubing 1½" in diameter by 12" long. The tubing was secured at both ends, and sensitivity, ballistic pendulum and rate of detonation tests were then run. The results are given in the table below:

TABLE V

| | Example 13 | 85:15 Mechanical Mixture | Control |
|---|---|---|---|
| Grad. density | 1.477 | 1.463 | 1.388. |
| "D" Sensitivity 1½" x 12" pipe. | 10 g. Pentolite | 40 g. Pentolite | 40 g. Pentolite. |
| Impact 2 kg | 100+ cm | 100+ cm | 100+ cm. |
| Impact 10 kg | 100+ | 100+ | 100+. |
| Ballistic Pendulum | 10.8 | 10.7 | 10.9. |
| Rate of Detonation | 5,945 m./sec. | 4,835 m./sec. | 3,920 m./sec. |

These results show the increased "D" sensitivity and rate of detonation of the conitrate over the mechanical mixture and nitrostarch.

*Example 14*

Another explosive slurry composition similar to that in Example 13 was prepared using the 85:15 conitrate of Example 8, and the other ingredients in the preparation shown in the table, below. A second composition was prepared substituting a mechanical mixture of the same proportions.

| | Example 14, Percent by Weight | 85:15 Mechanical Mixture |
|---|---|---|
| 85:15 Conitrate of Example 8 | 5.00 | |
| 85:15 Mechanical mixture | | 5.00 |
| Ammonium nitrate | 77.00 | 77.00 |
| ZnO | 0.50 | 0.50 |
| Riffle Coal | 4.30 | 4.30 |
| Guar Gum | 0.30 | 0.30 |
| Petroleum Oil | 0.40 | 0.40 |
| Water | 12.50 | 12.50 |
| | 100.00 | 100.00 |

These materials were extruded through conventional extrusion nozzles into polyethylene tubing 1½" in diameter by 12" long. The tubing was secured at both ends, and sensitivity, ballistic pendulum and rate of detonation tests were then run. The formulation of Example 14 containing the conitrate will show satisfactory "D" sensitivity and rate of detonation.

*Example 15*

Another explosive slurry composition similar to that in Example 13 was prepared using the 85:15 conitrate of Example 8, and the other ingredients in the preparations shown in the table, below. A second composition was prepared substituting a mechanical mixture of the same proportions, and a third control mixture, using nitrostarch.

| Ingredients | Percent by Weight | | |
|---|---|---|---|
| | Example 15 | Mechanical Mixture | Control |
| 85:15 Conitrate of Example 8 | 27.00 | | |
| 85:15 Mechanical Mixture | | 27.00 | |
| Nitrostarch | | | 27.00 |
| Ammonium Nitrate | 63.00 | 63.00 | 63.00 |
| ZnO | 0.80 | 0.80 | 0.80 |
| Riffle Coal | 1.30 | 1.30 | 1.30 |
| Guar Gum | 0.40 | 0.40 | 0.40 |
| Petroleum Oil (No. 5) | 0.50 | 0.50 | 0.50 |
| Water | 7.00 | 7.00 | 7.00 |

These materials were extruded through conventional extrusion nozzles into polyethylene tubing 1½" in diameter by 12" long. The tubing was secured at both ends, and sensitivity, ballistic pendulum and rate of detonation tests were then run. The results are given in the table below:

TABLE VI

| | Example 15 | Nitrostarch | Mechanical Mixture Control |
|---|---|---|---|
| Grad Density | 1.43 | 1.43 | 1.43 |
| "D" Sensitivity (1½" pipe), gm | 1 | 10 | 3 |
| B.P. No. 16 | 10.7 | 10.7 | 10.7 |

These tests show the increased "D" sensitivity of the conitrate-containing composition over the mechanical mixture and nitrostarch containing compositions.

What is claimed:

1. A homogeneous nonsegregating particulate conitrate consisting essentially of particles of about 10% to about 90% of conitrated nitrostarch and from about 10% to about 90% conitrated nitric acid alcohol ester having a melting point of at least 100° F., said conitrate having a high detonator sensitivity.

2. A conitrate in accordance with claim 1 wherein the alcohol is a polyol.

3. A conitrate in accordance with claim 2 wherein the polyol is a solid having at least four hydroxyl groups, at least four hydroxyl groups for every six carbon atoms, and at least four carbon atoms in the molecule.

4. A conitrate in accordance with claim 2 in which the polyol is a pentaerythritol.

5. A conitrate in accordance with claim 2 in which the polyol is a dipentaerythritol.

6. A conitrate in accordance with claim 2 in which the polyol is trimethylol ethane.

7. A conitrate in accordance with claim 2 in which the polyol is mannitol.

8. A conitrate in accordance with claim 2 wherein the polyol is a hydroxy acid ester of pentaerythritol.

9. A process for preparing a homogeneous non-segregating particulate conitrate comprising mixing and reacting a nitrating agent with a mixture of from about 10 to about 90% of an organic alcohol and from about 10 to about 90% of starch until a conitrate is formed.

10. The process of claim 9 wherein the nitrating agent is nitric acid in admixture with sulfuric acid.

11. The process of claim 9 wherein the temperature of reaction is maintained below about 75° F.

12. An explosive composition comprising a conitrate in accordance with claim 1, an oxidizer, and a fuel.

13. An explosive composition in accordance with claim 12, comprising a dispersing liquid in an amount to form a slurry.

14. An explosive composition in accordance with claim 12, comprising a dispersing liquid in an amount to form an extrudable semi-solid composition.

References Cited by the Examiner

UNITED STATES PATENTS

| | | | |
|---|---|---|---|
| 1,750,949 | 3/1930 | Wrightsman | 149—93 X |
| 1,751,064 | 3/1930 | Ahlum | 149—93 X |
| 2,154,552 | 4/1939 | Wyler | 149—93 X |

BENJAMIN R. PADGETT, *Primary Examiner.*

S. J. LECHERT, JR., *Assistant Examiner.*